W. M. CADY.
COMBINED NUT LOCK AND SWAB HOLDER.
APPLICATION FILED APR. 24, 1916.
1,266,662.
Patented May 21, 1918.
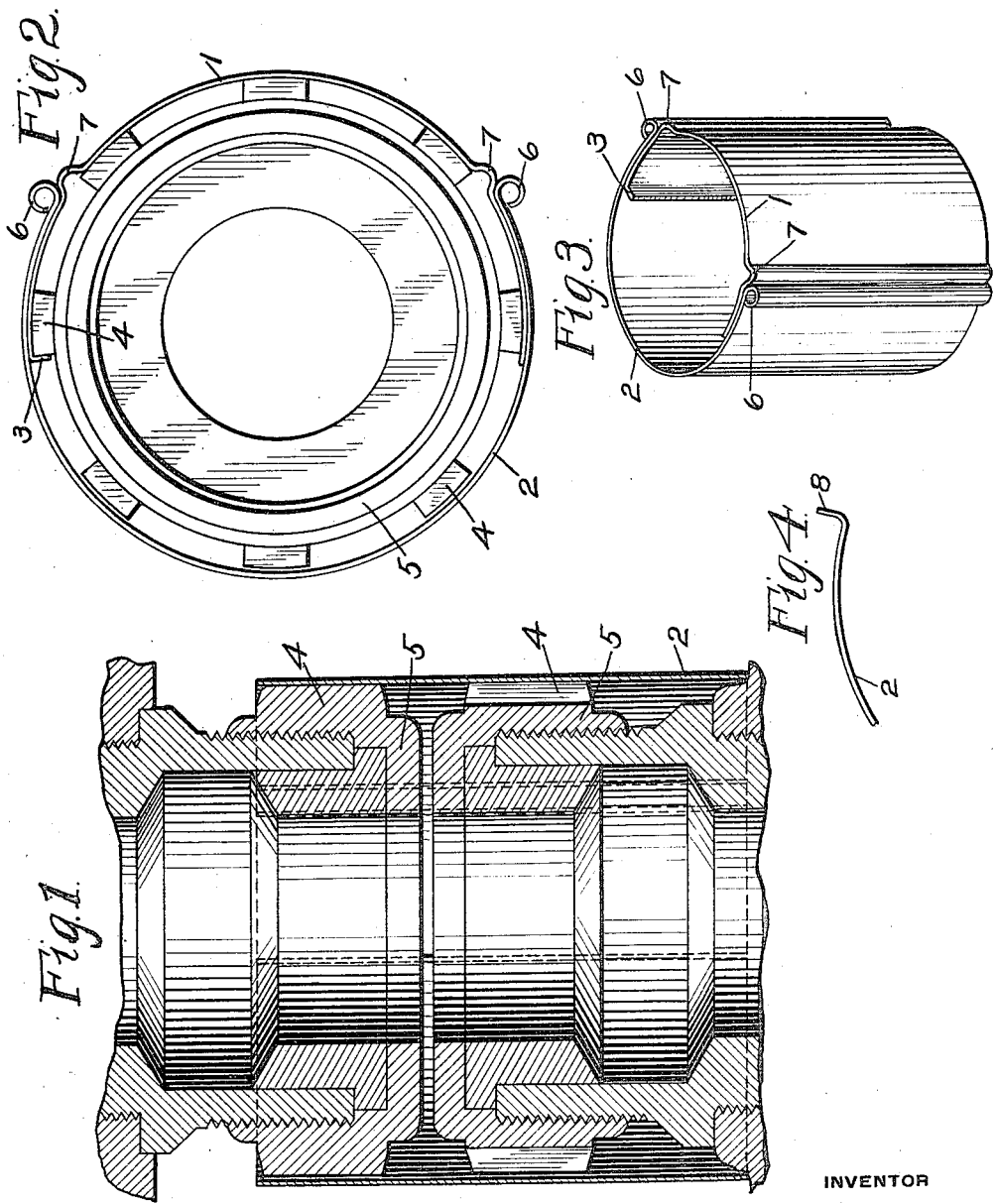
INVENTOR
William M. Cady

UNITED STATES PATENT OFFICE.

WILLIAM M. CADY, OF EDGEWOOD PARK, PENNSYLVANIA, ASSIGNOR TO THE WESTINGHOUSE AIR BRAKE COMPANY, OF WILMERDING, PENNSYLVANIA, A CORPORATION OF PENNSYLVANIA.

COMBINED NUT-LOCK AND SWAB-HOLDER.

1,266,662.      Specification of Letters Patent.      Patented May 21, 1918.

Application filed April 24, 1916. Serial No. 93,148.

*To all whom it may concern:*

Be it known that I, WILLIAM M. CADY, a citizen of the United States, residing in Edgewood Park, county of Allegheny, and State of Pennsylvania, have invented a certain new and useful Improvement in Combined Nut-Locks and Swab-Holders, of which the following is a specification.

This invention relates to combined nut locks and swab holders for locomotive steam pumps, and the principal object of the invention is to provide an improved device of this character.

In the accompanying drawing, Figure 1 is a central sectional view of the gland nut portion of a locomotive steam pump, showing the improved nut lock and swab holder applied thereto; Fig. 2 a plan view of a gland nut, with the nut lock and swab holder applied; Fig. 3 an isometric projection of the combined nut lock and swab holder; and Fig. 4 a plan view of a portion of one member, showing a slight modification thereof.

According to a preferred form of my invention, two sheet metal sections 1 and 2 are provided having cylindrical walls, the section 1 being slightly more than a semi-cylinder and the section 2 being of sufficient extent to overlap section 1 a liberal amount when the sections are placed together.

One edge 3 of the section 1 is bent inwardly so as to engage with the usual spanner wrench projections 4 of the gland nuts 5 and the edges 6 of the section 2 may be rolled over, so as to present a smooth rounded surface.

The section 1 is first applied to the gland nuts 5 and is placed at the rear, the engagement of the edge 3 with adjacent projections 4 of the upper and lower gland nuts 5 acting as a nut lock to prevent turning of the nuts.

The section 2 is then sprung over the gland nuts from the front, so that when the sections are in position, they will be as shown in Figs. 2 and 3 of the drawing.

Longitudinally extending humps 7 may be formed in the member 1 adjacent to the rolled edges 6 of the member 2, so as to prevent rotative movement of the member 2 when in position.

It will now be seen that the present device holds the swab in position, prevents the entrance of dirt to the packing, and locks the gland nuts. The construction can also be cheaply manufactured and readily applied and removed.

In order to facilitate the application of the member 2, the same may be provided with projecting flanges 8 as shown in Fig. 4 instead of the loops 6, so that in applying, the flanges may be grasped and the member sprung apart or opened up to enable the member to be more readily passed over the gland nuts and the other member.

Having now described my invention, what I claim as new and desire to secure by Letters Patent, is:

1. A swab holder for compressors comprising two overlapping cylindrical members inclosing the gland nuts, one member being sprung over the other in positioning the members.

2. A combined nut lock and swab holder for compressors comprising a cylindrical member partially encircling the gland nuts and having a flanged portion adapted to engage the spanner wrench projections of the gland nuts and another cylindrical member opposing and overlapping the first member to entirely inclose the gland nuts.

3. A combined nut lock and swab holder for compressors comprising a cylindrical member partially encircling the gland nuts and having a flanged portion adapted to engage the spanner wrench projections of the gland nuts, another cylindrical member overlapping the first member, and projections on the first member for preventing rotative movement of the second member.

4. A swab holder for compressors comprising cylindrical members adapted to partially encircle the gland nuts of the compressor one member being adapted to overlap the other member and having outwardly flared portions at the edges to serve as finger grips in opening up said member.

In testimony whereof I have hereunto set my hand.

WILLIAM M. CADY.

Copies of this patent may be obtained for five cents each, by addressing the "Commissioner of Patents, Washington, D. C."